United States Patent
Wu

(10) Patent No.: US 7,162,659 B2
(45) Date of Patent: Jan. 9, 2007

(54) METHOD FOR ACCESSING DATA OF DEFECTED OPTICAL DISK

(75) Inventor: Yuan-Ting Wu, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 606 days.

(21) Appl. No.: 10/248,195

(22) Filed: Dec. 25, 2002

(65) Prior Publication Data

US 2003/0237020 A1    Dec. 25, 2003

(30) Foreign Application Priority Data

Jun. 25, 2002  (TW) .............................. 91113833 A

(51) Int. Cl.
*G06F 11/00*    (2006.01)
(52) U.S. Cl. .................. 714/7; 714/5; 714/6; 714/8
(58) Field of Classification Search .............. 714/5, 714/6, 7, 8
See application file for complete search history.

(56) References Cited

U.S. PATENT DOCUMENTS 6,031,804 A * 2/2000 Yamamuro ............... 369/47.14
6,182,240 B1 * 1/2001 Mine ............................ 714/5
6,330,641 B1 * 12/2001 Yoshioka ..................... 711/113
6,414,923 B1 * 7/2002 Park et al. ............... 369/53.15
6,546,502 B1 * 4/2003 Ishi ............................. 714/7
6,581,167 B1 * 6/2003 Gotoh et al. .................. 714/7
6,615,363 B1 * 9/2003 Fukasawa ..................... 714/5
6,725,395 B1 * 4/2004 Ono et al. ..................... 714/8

* cited by examiner

*Primary Examiner*—Robert Beausoliel
*Assistant Examiner*—Joseph D Manoskey
(74) *Attorney, Agent, or Firm*—Winston Hsu

(57) ABSTRACT

A method for accessing data in an optical disk with a drive. The drive has a memory. The optical disk has data blocks for recording data, and spare blocks for replacing defect data blocks. The method includes reading a predetermined number of spare blocks into the memory, and while reading a defect data block, checking whether a corresponding replacing spare block is stored in the memory. If so, suspending further reading of the spare block. Otherwise, reading the spare block with a predetermined number of other spare blocks into the memory to reduce further reading of spare blocks.

20 Claims, 23 Drawing Sheets

(Read process)

METHOD FOR ACCESSING DATA OF DEFECTED OPTICAL DISK

BACKGROUND OF INVENTION

1. Field of the Invention

The present invention relates to a method for defect management of an optical disk while an optical disk drive writes data onto or reads data from the optical disk. More specifically, a method of reducing seeking optical disk trace times while reading or writing data by pre-reading a plurality of spare packets as a cache is disclosed.

2. Description of the Prior Art

Optical disks, because of their low price, small volume, light weight, and large storage capacity, have become one of the most common data storage media used in modern society. More specifically, the development of rewritable optical disks has made the optical disk the most important portable personal data storage media that can store user's data depending on the user's demand. How to access disk data with higher efficiency and reliability is the main point of modern information development.

A drive accesses data in a corresponding optical disk. Please refer to FIG. 1, which illustrates a block diagram of a conventional drive 10 accessing an optical disk 22. The drive 10 comprises a housing 14, a motor for driving the housing rotation, a pickup head 16 for accessing the data in the optical disk, a controller 18 for controlling the operation of the drive 10, and a memory 20 (such as volatile random access memory) for storing the data in the operation duration of controller 18. The optical disk has a track 24 for recording the data.

The controller 18, depending on the command from the host 26, can access the data on the track 24 with the optical pickup head 16 skipping the track 24 of the optical disk 22 set on the housing 14 driven by the motor 12. The host 26 could be a computer system of a PC (Personal Computer).

In order to record the data to the optical disk in a more reliable and durable manner, some progressive specifications of the optical disk are regulated with certain defect management mechanisms.

One of the most common strategies used is to allocate a part of spare record areas for recording the data due to the damage of the optical disk, resulting in original allocated data record areas being useless. Please refer to FIG. 2A and FIG. 2B, which illustrate the charts about the allocation of the spare record area and general record area in the two different kinds of optical disk specifications respectively; FIG. 2A is for CD-MRW (Compact Disk—Mount Rainier rewritable) and FIG. 2B is for DVD (Digital Versatile Disk)+MRW.

Referring to FIG. 2A, the track 24 on the optical disk 22 for recording data is divided into several groups of LI (Lead-In Area) for marking the beginning of the track 24, PA (Program Area) for recording the data and LO (Lead-Out Area) for marking the end of the track 24. The LI is also divided into a field for MTA (Main Table Area) used to store a DT (Defect Table). The PA is also divided into P0 (pre-gap), GAA (General Application Area), STA (Secondary Table Area) for storing the copy of DT, a plurality of DAs (Data Area), and a plurality of SAs (Spare Area). The different DAs were marked as DA(1), DA(2) . . . DA(N). The PA also has a plurality of SAs, corresponding to each DAs respectively, marked as SA(1), SA(2) . . . SA(N). Each DA is further divided into a predefined plurality of Pd (data packet) having a plurality of Bd (user data block) used to record data. Similarly, each SA(n) is further divided into a plurality of Ps (spare packet) having a plurality of Bs (spare data block). Bd and Bs have identical data capacity. In CD-MRW, for example, each DA has 136 Pds; each Pd has 32 Bds. Each SA has 8 Ps; each Ps has 32 Bs. Each Bd and Bs is used to record 2 k (kilo) bytes. Referring to FIG. 2A, the optical pickup head 16 passes through all the blocks (including DA and SA) in turn as the track 24 on the optical disk 22 skips the optical pickup head 16. For example, while the optical pickup head 16 skips the track 24 in the direction of A1 in FIG. 2A, it is going to pass through each spare block of SA first, then each data block of DA and the following is another SA.

Please refer to FIG. 2B. According to similar allocation principle in DVD+MRW, the track 24 also has a Ll2 for marking the beginning of the track 24, a DZ (data zone) for recording the data, and a LO2 for marking the end of the track 24. There is a MTA2 for storing a defect table in the Ll2. The DZ is also divided into a GAA2 (General Application Area), a STA2 (Secondary Table Area) for storing the copy of the defect table, a UDA (User Data Area), and two SA1, SA2 (Spare Area). Similarly, the UDA has a plurality of Bd0 (like 139218 ECC blocks), and both SA1 and SA2 have a plurality of Bs0 (like 256 and 3840 ECC blocks respectively).

No matter which form the optical disk 22 has in FIG. 2A and FIG. 2B, the basic principle of the defect management is identical. Data from the host 26 is prior written to the DA; if failure is due to damage of the optical disk 22, the track 24 will seek a replacing spare block for writing data. All the spare blocks and data blocks have their own addresses (as PBN, Physical Block Number). Both the addresses of the defect data area and the corresponding spare block for replacing the defect data area, and their corresponding relationship are recorded in the DT of the optical disk 22. The drive 10 depends on DT to find the replaced spare block and reads the data stored in the replaced spare block while reading a defect data area. According to stated above, the optical disk 22 can record data by the settlement and the usage of the spare blocks to carry out defect management even though there is partial damage (perhaps caused from scrape or slight dust) on the optical disk 22.

The following will take the CD-MRW to be an example to introduce the implementation of the prior art. Please refer to FIG. 3 (also FIG. 1). FIG. 3 is a flowchart illustrating the conventional optical disk write flow 100. To implement the defect management mechanism, the former optical disk write flow occurs as follows:

Step 102:Start;

Step 104:

The drive 10 receives the write command from the host 26 and prepares to write the data from the host 26 into the optical disks 22. The drive 10 begins to execute the command from the host 26 to write the assigned data from the user into the optical disk 22. Data from the host 26 is held in the memory 20 initially;

Step 106:

Determine whether a defect data block is encountered in the duration of the data write process; if yes, go to step 108; if not, go to step 112. In this embodiment, the unit which data is written to each time is one packet instead of one data block. The host 26 can control the drive 10 writing data to the assigned packet; the drive 10 also can analyze which packet is used during the write process by the reader 16 detecting and recognize whether encountering a defect data block in the packet based on the defect table;

Step 108:

The prior art, if encountering a defect data, halting the write process, and writing the data initially written to the defect data block to another replacing spare block, is disclosed. Based on defect table, the drive 10 can find out the address of the corresponding spare block of the defect data block and make the optical pickup head 16 seek to the location of the spare block for the data being written. On account of the feature that one time for one packet in the duration of data written to the optical disk, the drive 10 would read data within other spare blocks belonging to the packet where the appointed spare block is from the memory 10;

Step 110:

Data within the spare blocks attached to the packet is written back to the optical disk 22 from the memory 20, so that it alters the data written to the defect data block initially to the spare block to maintain the function of the optical disk 22 recording the data;

Step 112:

Keep doing general write process; in other words, writing data into the data block that the host 24 assigns. Step 110 followed by step 112 represents that the pickup head 16 is moved to the corresponding data block to keep doing the general write process after the pickup head 10 had written the data into the spare block;

Step 114:

Determine if any new write request is received; If yes, go back to step 104 to continue next data write process. If not, go to step 116;

Step 116:End;

The following further illustrates the above write process 100. Please refer to FIG. 4A, FIG. 4B and FIG. 4C (and also FIG. 1 and FIG. 2A). FIG. 4A, FIG. 4B and FIG. 4C are allocation charts about the data stored in the track 24 and the memory 20 during the conventional write process 100. As FIG. 4A illustrates, the controller 18 makes data from the host 26 being held in the memory 20, then the data from the memory 20 is written onto the track 24 by the pickup head 16. Assuming that the host 26 transfers data within the packets Pd1, Pd2 and Pd3 to the drive 10 successively, the pickup head 16 of the drive 10 moves to the corresponding location of the Pd1, Pd2 and Pd3 to write the data into the Pd1, Pd2 and Pd3 in turn. Assuming that all the data blocks of the Pd1 are non-defects, the drive 10 would write data into the Pd1 successfully. Assuming that the data blocks of the Pd2, such as Bd2a, Bd2b, are not defects except Bd2c, it will go to step 108 to alter the data originally written into the Bd2c into a spare block. As FIG. 4B illustrates, assuming that using the spare block Bs1c of the spare packet Ps1 to take place of the defect data block Bd2c in step 108, pickup head 16 seeks to the location of the Ps1, reads all data within the spare blocks of the Ps1 to memory 10 (as step 108(1) marked in FIG. 4B), and adds the data written into the Bd2c initially to the Ps1 that has been read to memory 20 (as step 108(2) marked in FIG. 4B). As FIG. 4C illustrates, the pickup head 16 would write back data within the Ps1 stored in the memory 20 to the Ps1 on track 24. In step 112, the pickup head 16 seeks to the corresponding location of the Pd2, and continues to write the data into non-defect data blocks (like Bd2a and Bd2b) of the Pd2 and the following normal packets (like Pd3).

Some spare blocks of the Ps1 have replaced other defect data blocks (like Bs1a and Bs1b in FIG. 4B and FIG. 4C), and the drive 10 writing the data into the Ps1 has to follow the principle that one time for one packet instead of one block. So the original data within the Ps1 (like data within Bs1a and Bs1b) has been read to the memory 20.

Accordingly, referring to step 110 showing in FIG. 4C, when all the data is written back to Ps1, the initial data within the Ps1 and new data written to the Bd2c initially are written to Bs1c together.

From the conventional write process flow 100 stated above, while encountering a defect data block, and suspending the general data-writing, the pickup head 16 seeks to the spare block to replace the defect data block. Then, the pickup head 16 moves to the interrupted place to keep the general data-writing. If encountering other defect data blocks during the write process, the pickup head 16 has to repeat the above defect management flow again. Needless to say, the more defect data blocks are encountered, the more frequently the pickup head 16 seeks to compensate the defect data blocks. The more seeking across a plurality of packets results in the more time for waiting the stability of the pickup head 16. Therefore, the frequent seeking causes the lower efficiency of the write flow 100 and the burden of the machine of the drive 10.

In contrast to the write flow 100, please refer to FIG. 5 (also refer to FIG. 1). FIG. 5 illustrates the conventional flow 200 for the optical disk data-reading. The flow 200 is as follows:

Step 202:Start;

Step 204:

Check whether the read command from the host 26 is received; if yes, go to step 206; if not, go to step 214;

Step 206:

The pickup head 10 of the drive 10 depending on the read command moves to the corresponding data blocks, and reads data within the corresponding data blocks to obtain the data that host 26 requests. The data read by the pickup head 16 is held in the memory 20;

Step 208:

According to DT (defect table) within the optical disk 22, the drive 10 can check whether encountering defect data blocks in step 206. If yes, go to step 210; if not, go to step 212;

Step 210:

The drive 10 finds the address of the replacing spare block based on DT during the read process. At this moment, the pickup head 10 moves to the corresponding place based on the address to read data within the replacing spare block. Then the data is held in the memory 20;

Step 212:

Transfer the data held in the memory 20 to the host 26. Step 212 following step 210 represents that drive 10 has read all the data, which the host 26 requests, within the spare blocks replacing the defect data blocks and has transferred the data to the host 26;

Step 214:

Determine whether all the data that the host 26 requests has been transferred. If yes, go back to step 204; if not, go to step 206;

Step 216:End;

The following further illustrates the above read process 200. Please refer to FIG. 6A, FIG. 6B and FIG. 6C (and also FIG. 1 and FIG. 2A). FIG. 6A, FIG. 6B and FIG. 6C are allocation charts about the data stored in the track 24 and the memory 20 during the conventional read process 200. As FIG. 6A illustrates, assume that the host 26 requests the drive 10 to read data within Pd1, Pd2 and Pd3 successively, therefore the pickup head 16 moves to the corresponding place of Pd1 to read data within Pd1 into the memory 20.

Assuming that there is no defect data block in Pd1, the data read from the Pd1 is transferred from the memory 20 to the host 26 successfully in step 210 followed step 206 and step 208. Assuming that all the data blocks of the Pd2, such as Bd2a, Bd2b, are no defect except Bd2c, the conventional flow 200 will suspend the data-reading and go to step 210 while the drive 10 begins to read data within Pd2. As FIG. 6B illustrates, based on the defect table pointing that the spare block of Bd2c is Bs1c, the drive 10 controls the pickup head 16 to seek to the corresponding place of Bs2c (marked as step 210(1)), read data within Bs1c to the memory 20 (marked as step 210(2)), and add the data into the Pd2 stored in the memory 20 (marked as step 210 (3)). After obtaining the whole data within Pd2, the drive 10 starts to transfer the data to the host 16. Because the drive 10 keeps reading data within Pd3, as FIG. 6C illustrates, the pickup head 16 is going to seek across multiple packets to read each data blocks of Pd3.

From the conventional read process flow 200 stated above, while encountering a defect data block and suspending the general data-reading, the pickup head 16 seeks to the spare block in place of the defect data block to read data within the spare block. Then, the pickup head 16 moves to the interrupted place to continue the general data-reading. If encountering other defect data blocks during the read process, the pickup head 16 have to repeat the above defect management flow again. Needless to say, the more defect data blocks are encountered, the more frequently the pickup head 16 seeks between spare blocks and data blocks. Therefore, The frequent seeking causes the lower efficiency of the write flow 100 and that of the read flow 200 and the burden of the machine portion of the drive 10 to decrease the drive's life.

SUMMARY OF INVENTION

In the prior art, the reading or write processes where interrupted frequently because of the individual defect management for each defect data blocks, resulting in the drive's repeated seeking, leads to lower efficiency and burden of machine portion of the drive.

In the claimed invention, before reading or write process, a plurality of spare blocks (for instance, one or more packets) are read to the memory of the drive as cache; it is then checked whether the relative data of defect management has been read to the memory during defect management. If yes, use the relative data to do defect management directly. Therefore, the claimed invention can seek actually (for refreshing the cache) after dealing with a plurality of defect data blocks to decrease the interrupts resulting from the defect management during data-writing or data-reading and the burden of machine portion of the drive, and to increase the efficiency of executing writing or read processes.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
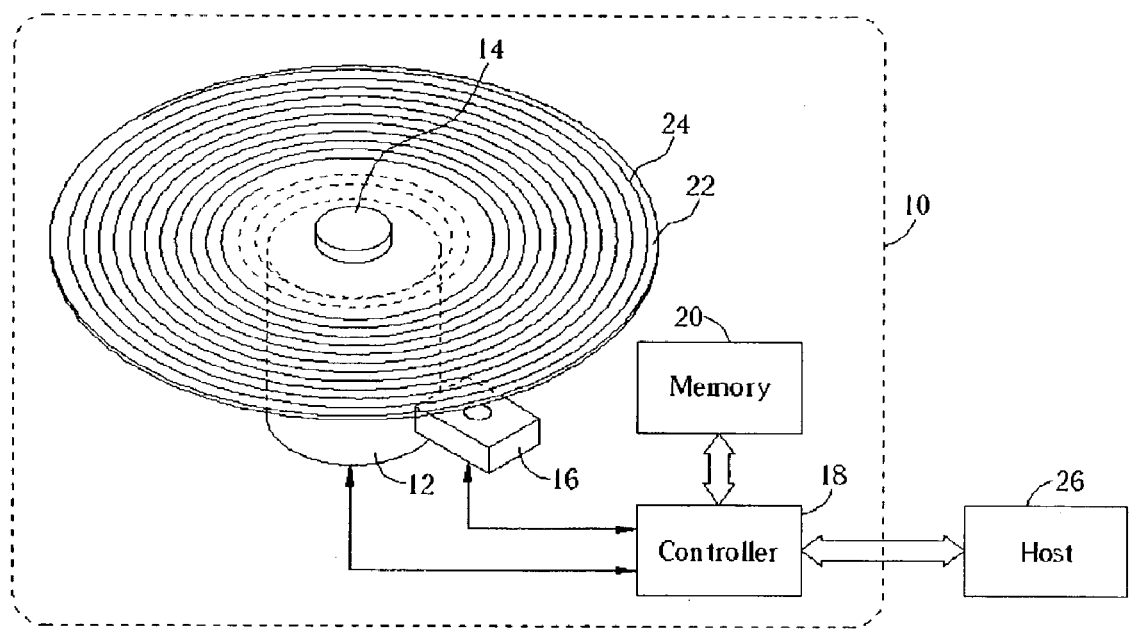
FIG. 1 is a block diagram of a conventional drive performing with a host.
Figure 2A:
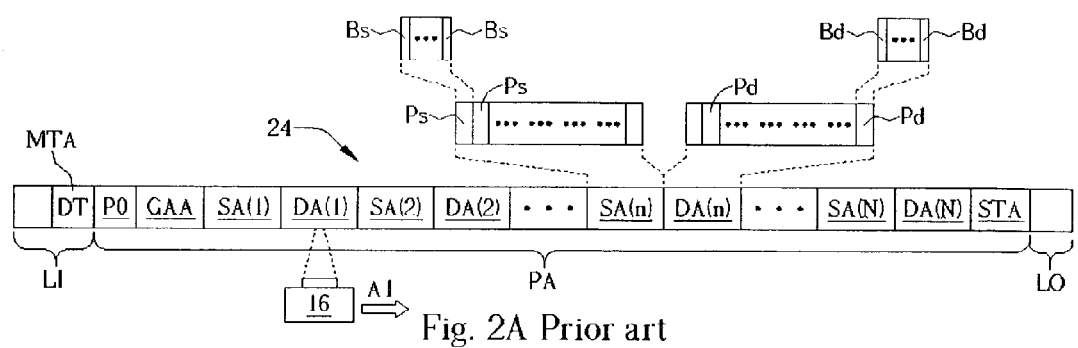
FIG. 2A and FIG. 2B are allocation schematic diagrams of related data in the duration of the flow proceeding.
Figure 2B:
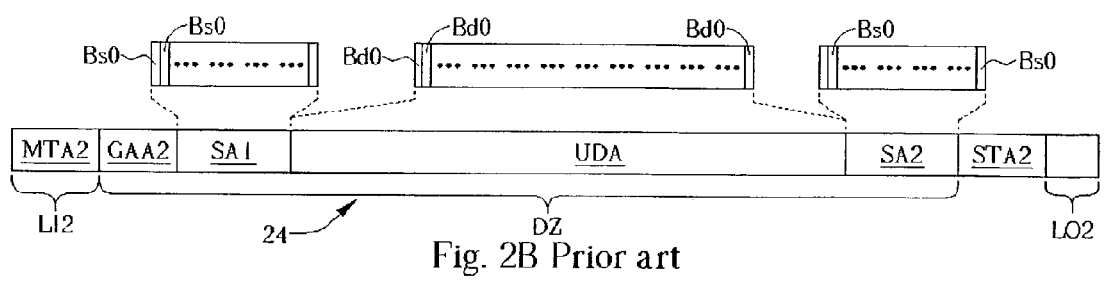
Figure 3:
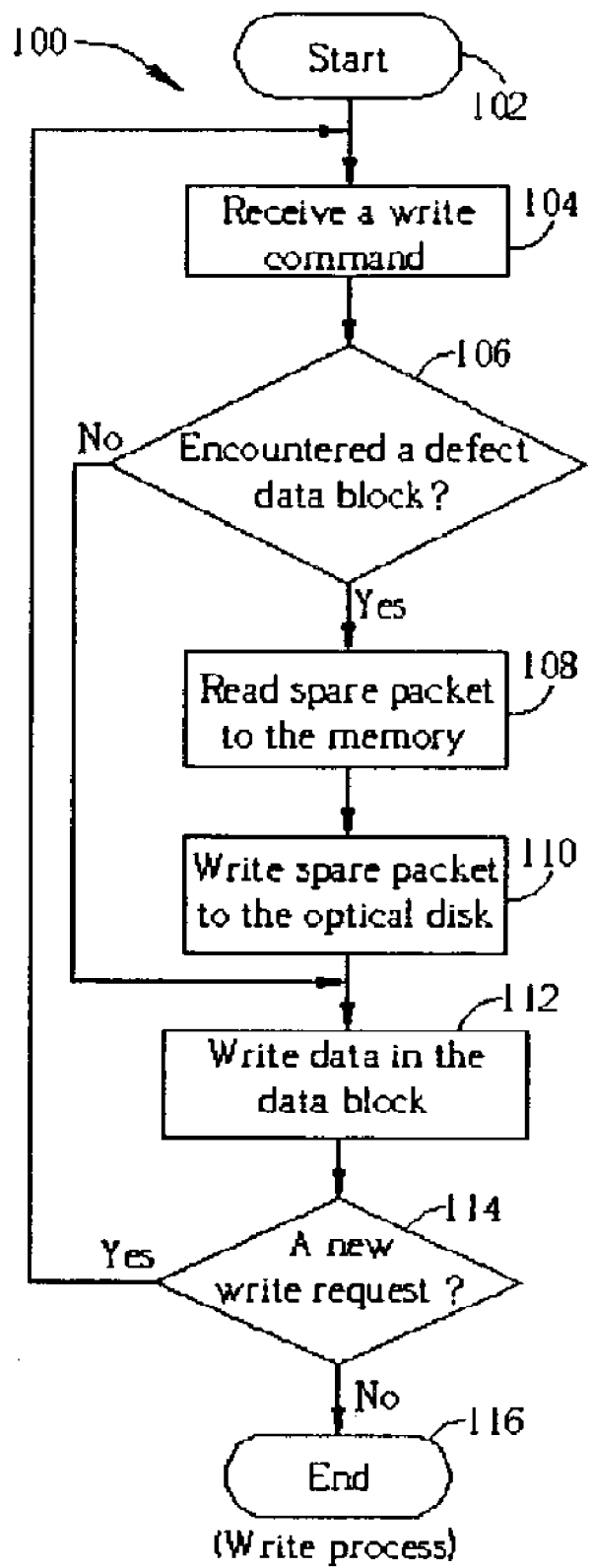
FIG. 3 is a flowchart illustrating the conventional write flow of the optical disk.
Figure 4A:
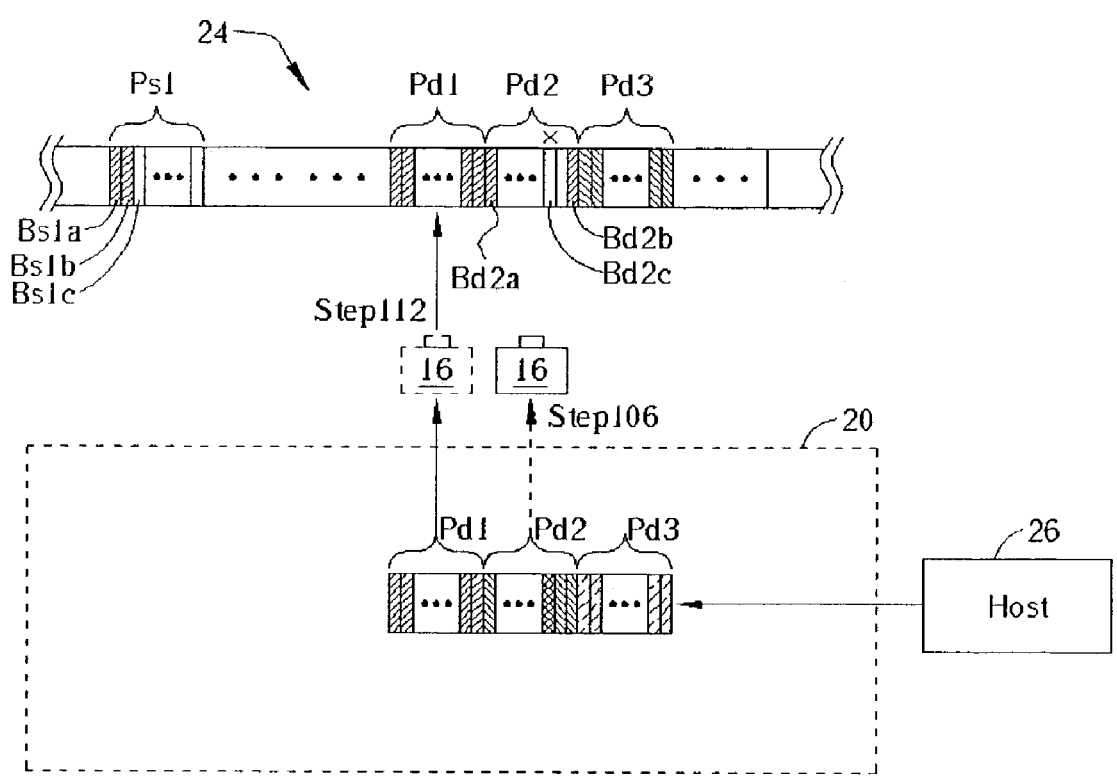
FIG. 4A, FIG. 4B and FIG. 4C are allocation schematic diagrams of related data according to the write flow illustrated in FIG. 3.
Figure 4B:
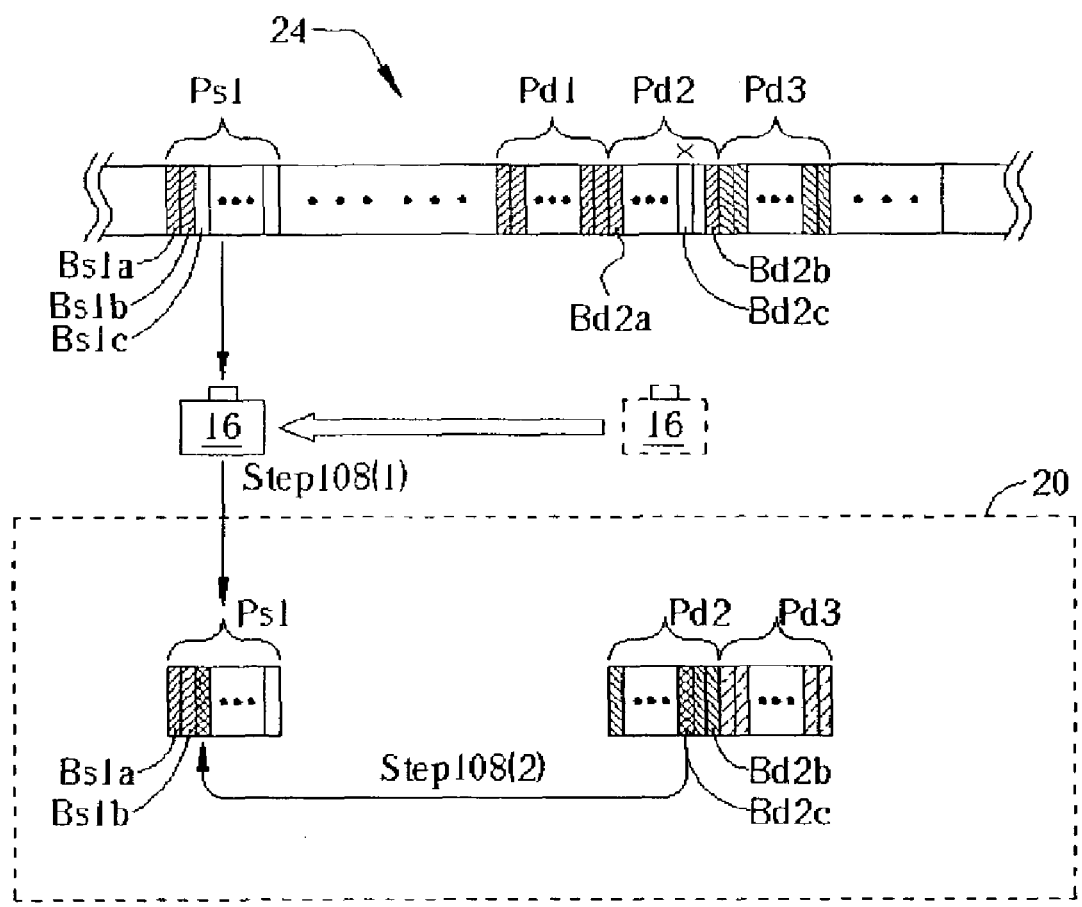
Figure 4C:
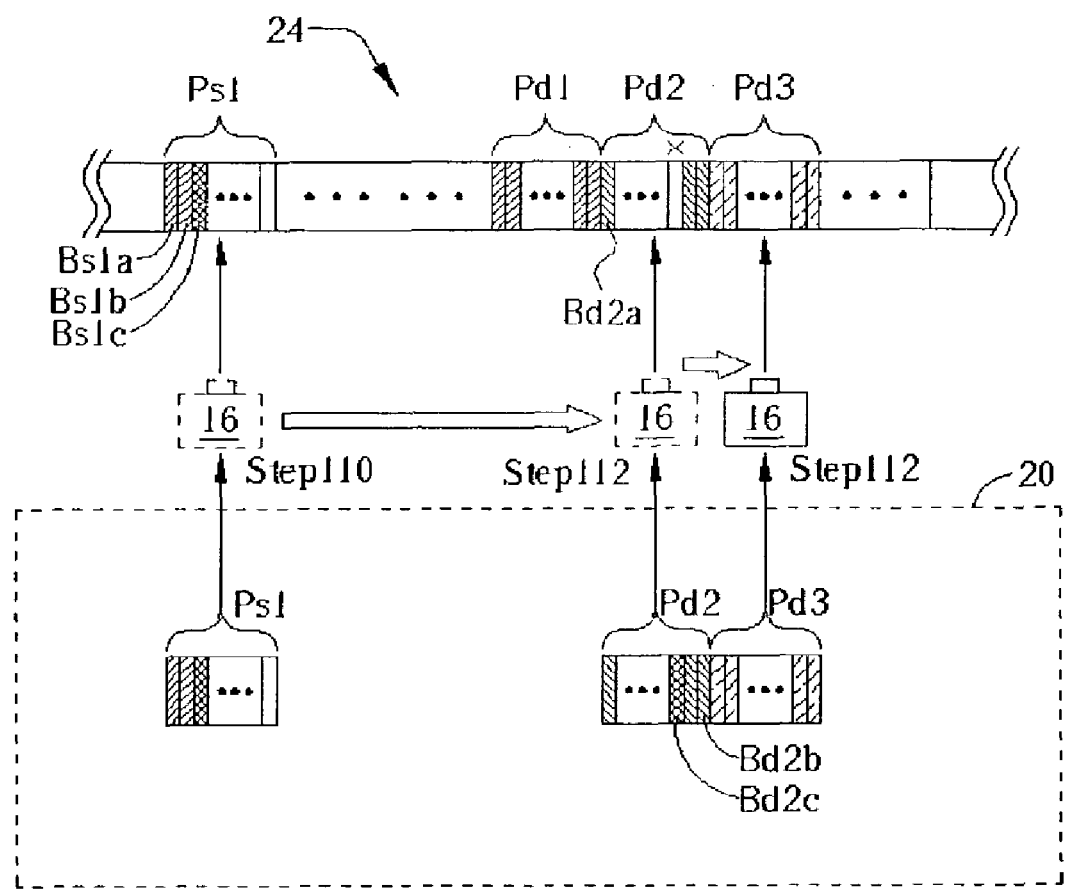
Figure 5:
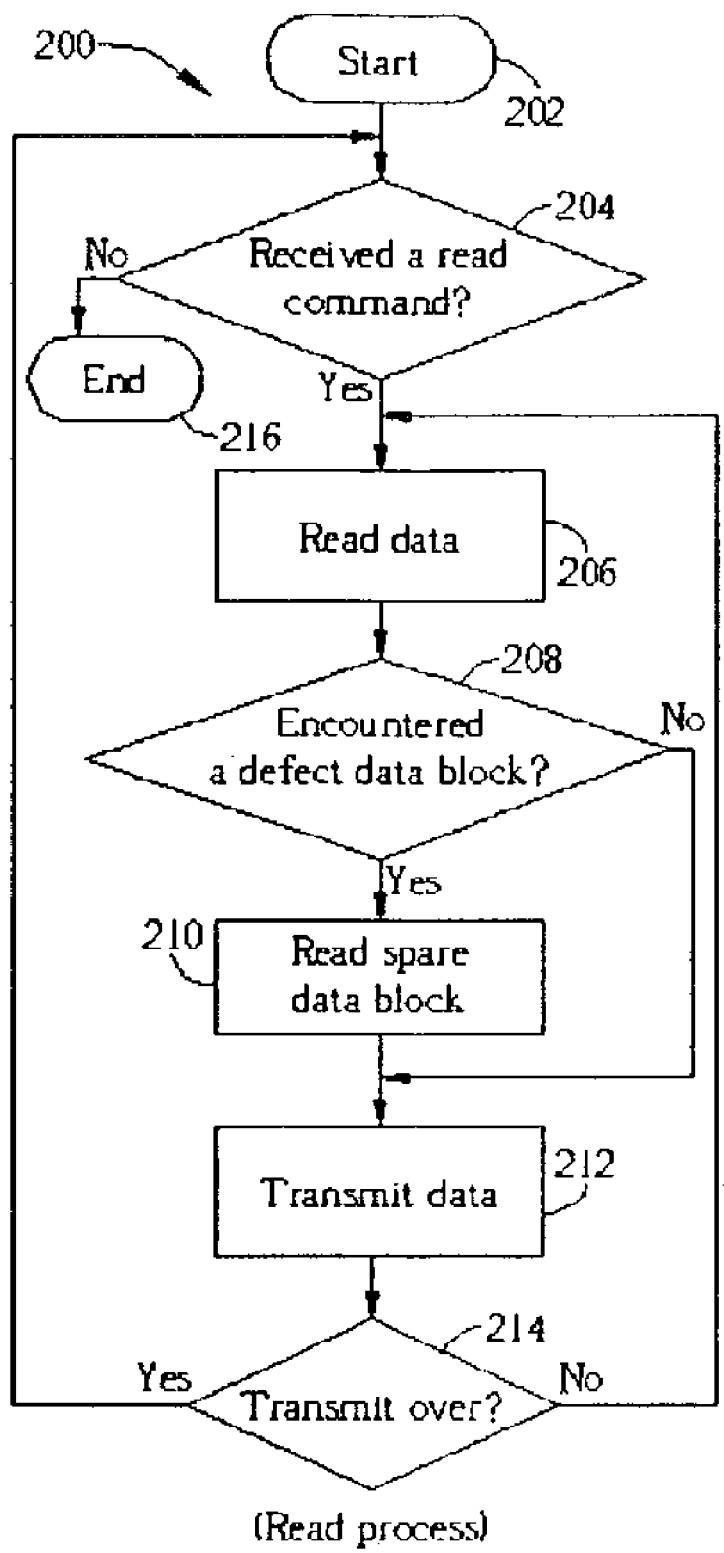
FIG. 5 is a flowchart illustrating the conventional drive read flow of the optical disk.
Figure 6A:
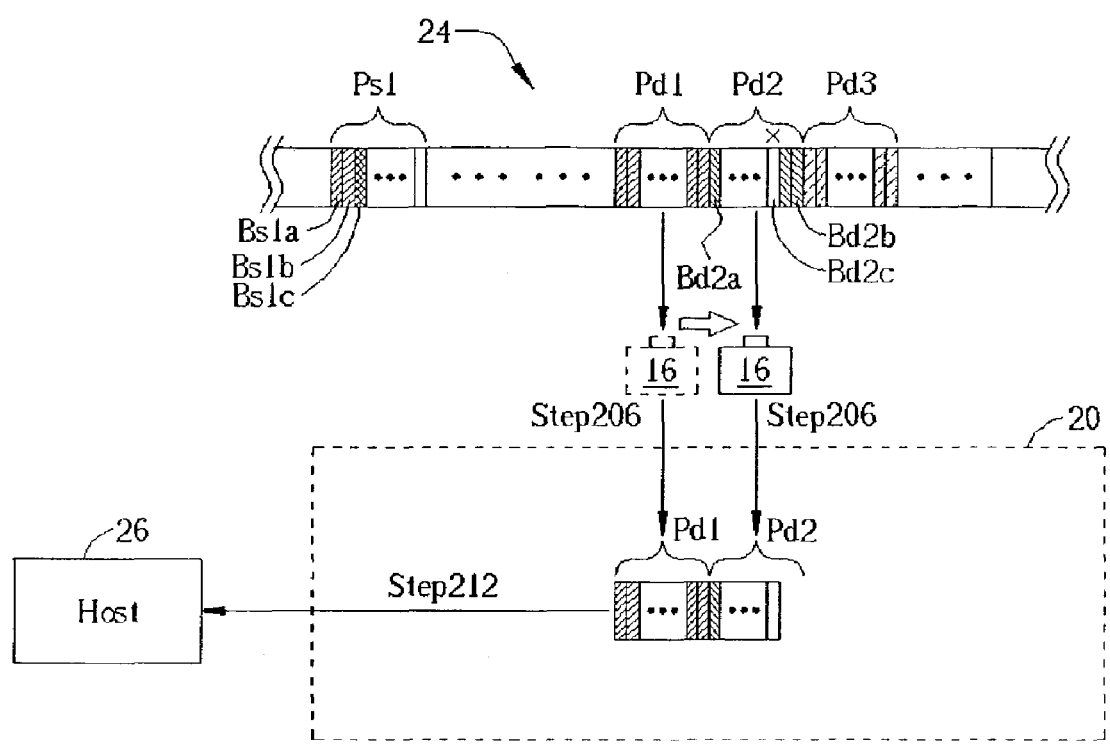
FIG. 6A to FIG. 6C are allocation schematic diagrams of related data according to the read flow illustrated in FIG. 5.
Figure 6B:
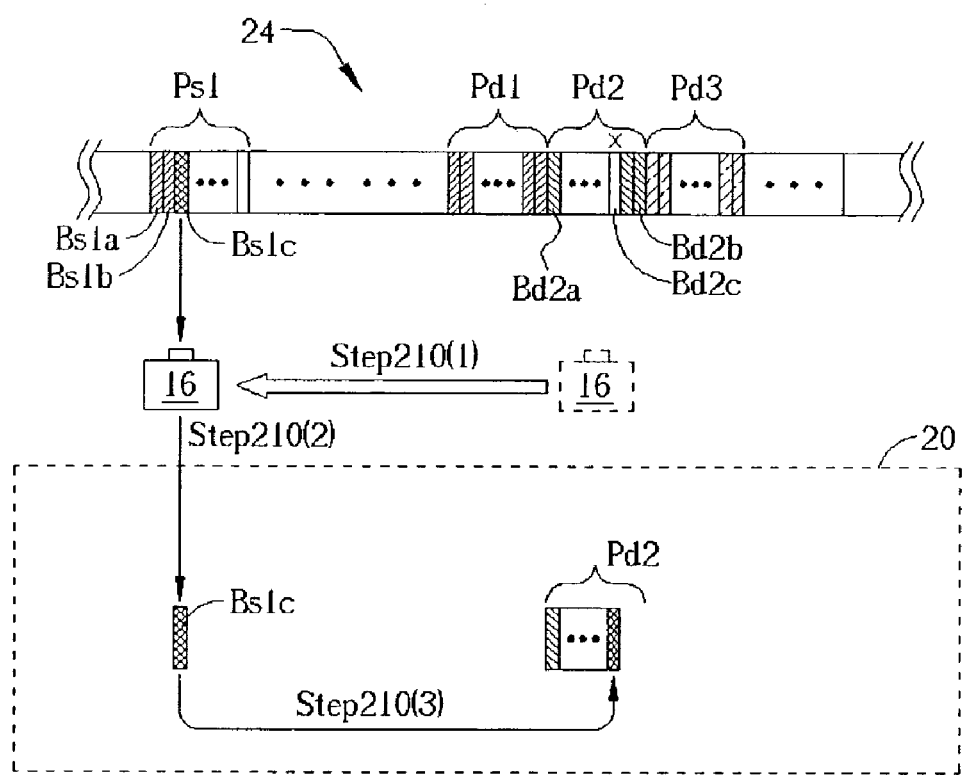
Figure 6C:
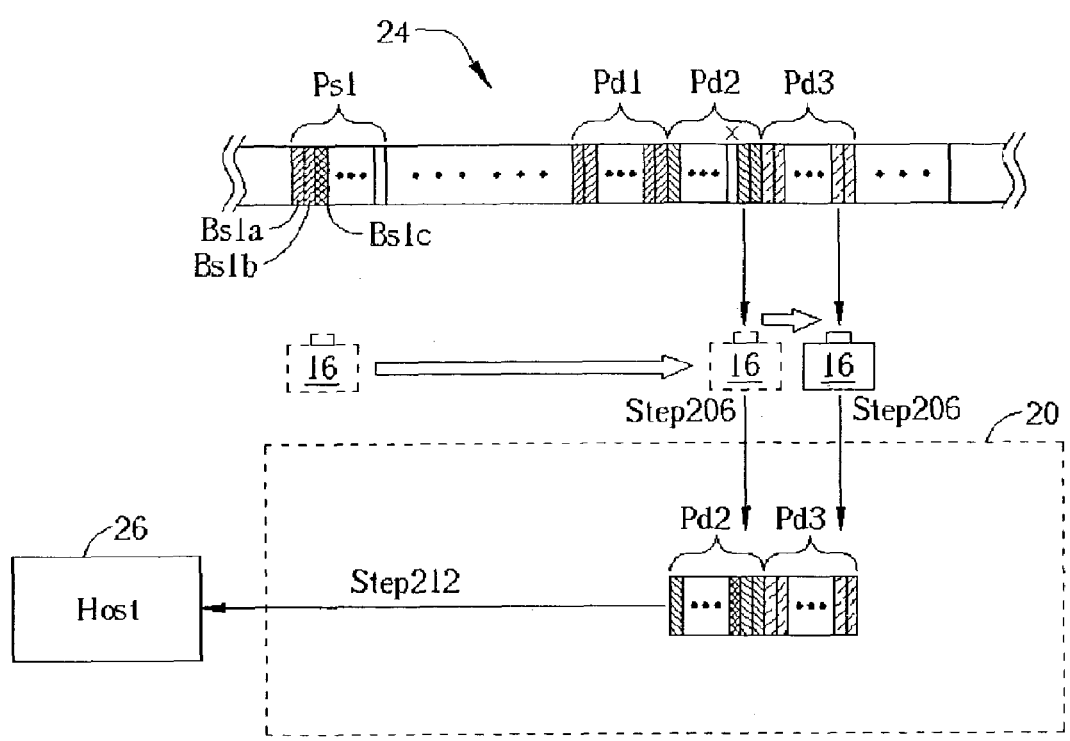
Figure 7:
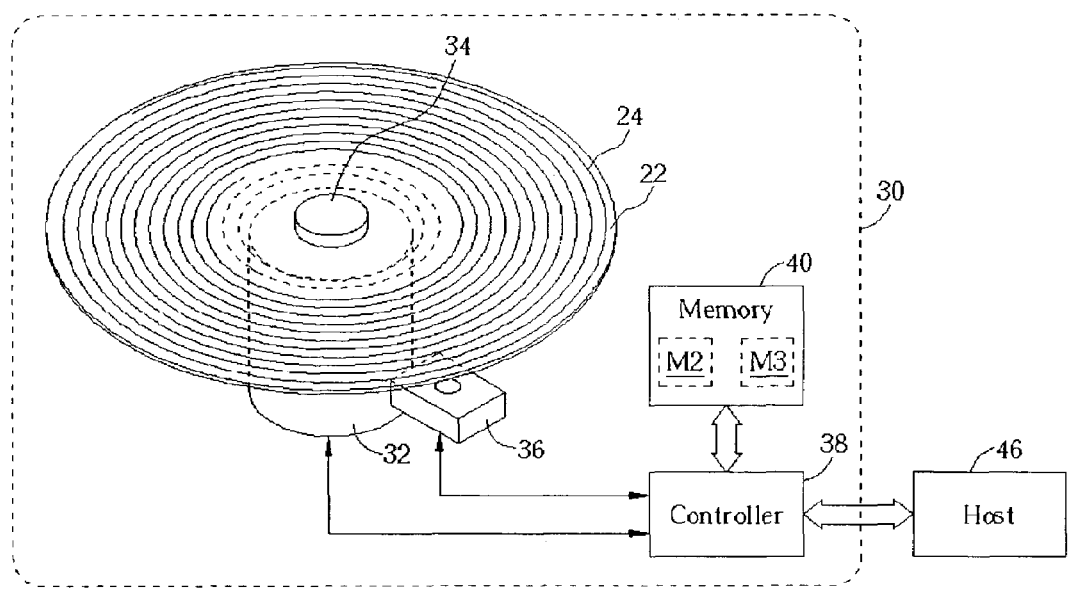
FIG. 7 is a block diagram of the drive performing with a host according to the present invention.

Please refer to FIG. 7. FIG. 7 illustrates a block diagram of a drive 30 that matches a host 46. The method of the present invention can be used in the drive 30 shown in FIG. 7. The user can control the drive 30 to access the data stored in the optical disk 22 via a host 46 (like the computer system of PC). The drive 30 comprises a housing 34, a motor 32 for driving the housing 34 rotation, a pickup head 36 for accessing data in the optical disk 22, a controller 38 for controlling the operation of the drive 30, and a memory 40 (such as volatile random access memory) for storing the data in the operation duration of the controller 38. The controller 38, depending on the command from the host 46, can access the data on the track 24 with the pickup head 36 skipping the track 24 of the optical disk 22 set on the housing 34 driven by the motor 32. The data specification recorded on the track 24 can be CD-MRW as shown in FIG. 2A or DVD+MRW as shown in FIG. 2B; in other words, the method discloses that the present invention is suitable for all optical disk specifications having spare blocks for defect management. In addition to memory spaces for recording data, the memory 40 comprises two other memory areas M2, M3 for holding a plurality of data within spare blocks as caches. M2 and M3 can be real memory (like random access memory) or two memory spaces allocated in the memory 40.

Figure 8:
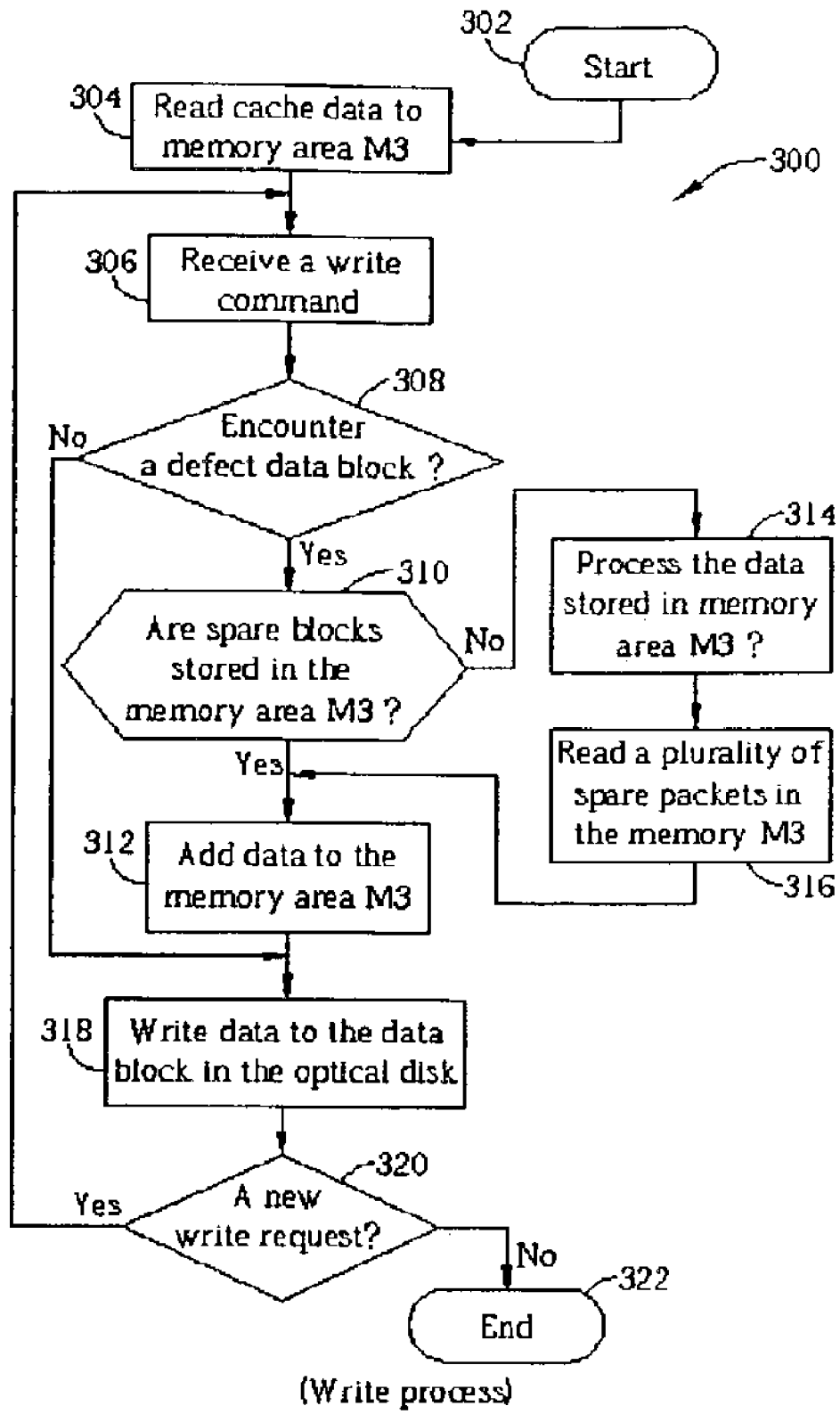
FIG. 8 is a flowchart illustrating a write flow of the present optical disk.

The purpose of the present invention is to increase the efficiency of data-writing and data-reading under the defect management mechanism. Please refer to FIG. 8. Taking the CD-MRW specification for example, FIG. 8 shows a flowchart of the data-write flow 300 in the present invention. The following is as follows:

Step 302:Start;

Step 304:

Pre-read a plurality of data within spare blocks to memory area M3 as cache. In the embodiment, enable reading a plurality of spare packets as cache (each spare packets having a plurality of spare blocks);

Step 306:

The drive 30 receives the write command from the host 46 for writing data to the optical disk 22. The host 46 will assign which data blocks the data is written to;

Step 308:

Checking whether encountering a defect data block in the assigned data blocks. Based on the defect table for recording the address of the defect data block, the drive 30 can determine whether the assigned data blocks have defect data block. If yes, go to step 310; if not, go to step 318;

Step 310:

Since encountering a defect data block, further check whether the spare block for replacing the defect data block and the spare packet comprising the spare block are read to M3. If yes, go to step 312; if not, go to step 314;

Step 312:

If the replacing spare block and the spare packet which the replacing spare block attached to have been stored in the memory area M3, the data originally written to the defect data block is added to the spare packet in memory area M3, and the pickup head 36 does not need to read the spare block belonging to the spare packet.

Step 314:

If the spare packet comprising the spare block for replacing the defect data block is not stored in memory area M3 in step 308, determine how to deal with memory area M3 based on whether the spare packet in M3 is refreshed (in other words, whether the spare packet is added to new data). If the spare packet is refreshed, it means that step 312 had been executed before and the spare block of the spare packet in memory area M3 has replaced the defect data block defected in step 308. Under the circumstances, write back the refreshed spare packet to the optical disk 22. If the spare packet is unrefreshed, it means that it is not necessary to use the spare block of the spare packet to replace defect data block; now that data within the spare packet remains, it is not necessary to write back the spare packet to the optical disk 22. At the moment, memory area M3 can release memory space which is used to store the spare packet to store other new cache data.

Step 316:

If the spare block (and the spare packet which the spare block is attached to) for replacing the defect data block is not stored in memory area M3, read the spare block and the spare packet which the spare block is attached to the memory area M3. Furthermore, further read spare packets adjacent to the above spare packet to memory area M3. In contrast with a plurality of defect data blocks, spare blocks for replacing the plurality of defect data blocks are also attached to identical packet or adjacent packet; therefore, as far as following encountered defect data blocks are concerned, the corresponding spare blocks perhaps have read to memory area M3. In this way, the frequency of the pickup head 36 seeking is reduced by step 316.

Step 318:Write data to the data block.

Step 320:

Determine whether any other data is written to the optical disk if yes, return to step 306, if not, go to step 322.

Step 322:End.

Figure 9A:
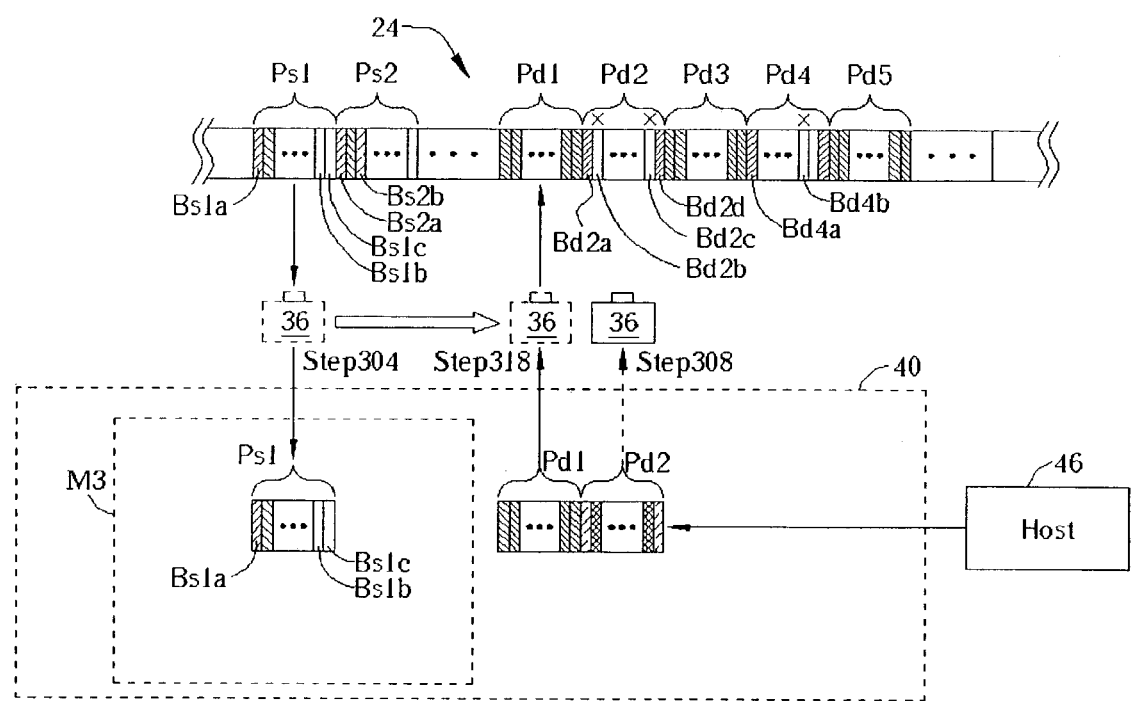
FIG. 9A to FIG. 9E are allocation schematic diagrams of related data while the flow illustrated in FIG. 8 is performed with the drive shown in FIG. 7.

To describe the above flow in detail, please refer to FIG. 9A to FIG. 9E (and FIG. 7). FIG. 9A to FIG. 9E are the schematic diagrams explaining data allocation of track 24 on an optical disk 22, a memory 40, and a memory area 30 during the write process 300 of the present invention. As FIG. 9A illustrates, the pickup head 36 has read all data within spare blocks as cache in step 304. A host 46 requests a drive 30 to write data to data packets pd1 to pd5 on track 24 successively; Drive 30 has stored the data in memory 40. Assuming that data packet Pd2 has normal data blocks (like Bd2*a*, Bd2*d*) except two defect data blocks Bd2*b* and Bd2*c*; the data packet Pd4 has normal data blocks (like Bd4*a*) except a defect data block Bd4*b*. While the drive 30 writes data into data packet Pd1, because data packet Pd1 has no defect data block, data is written to the track 24 successfully in step 318.

Figure 9B:
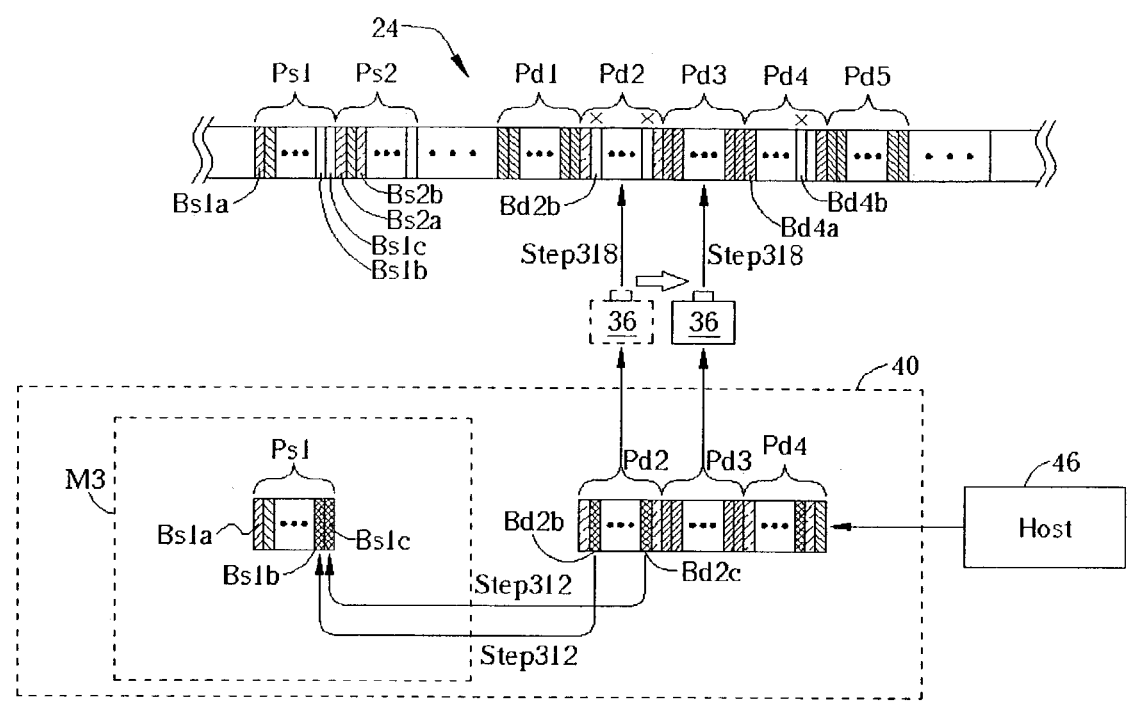
Figure 9C:
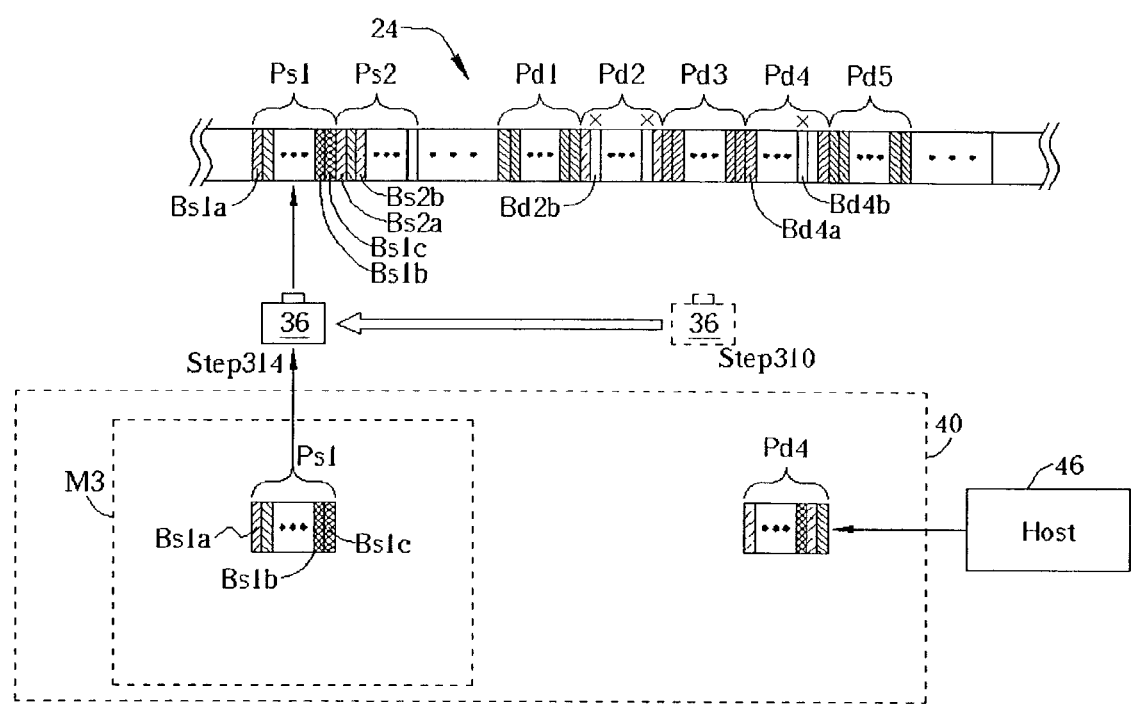
Figure 9D:
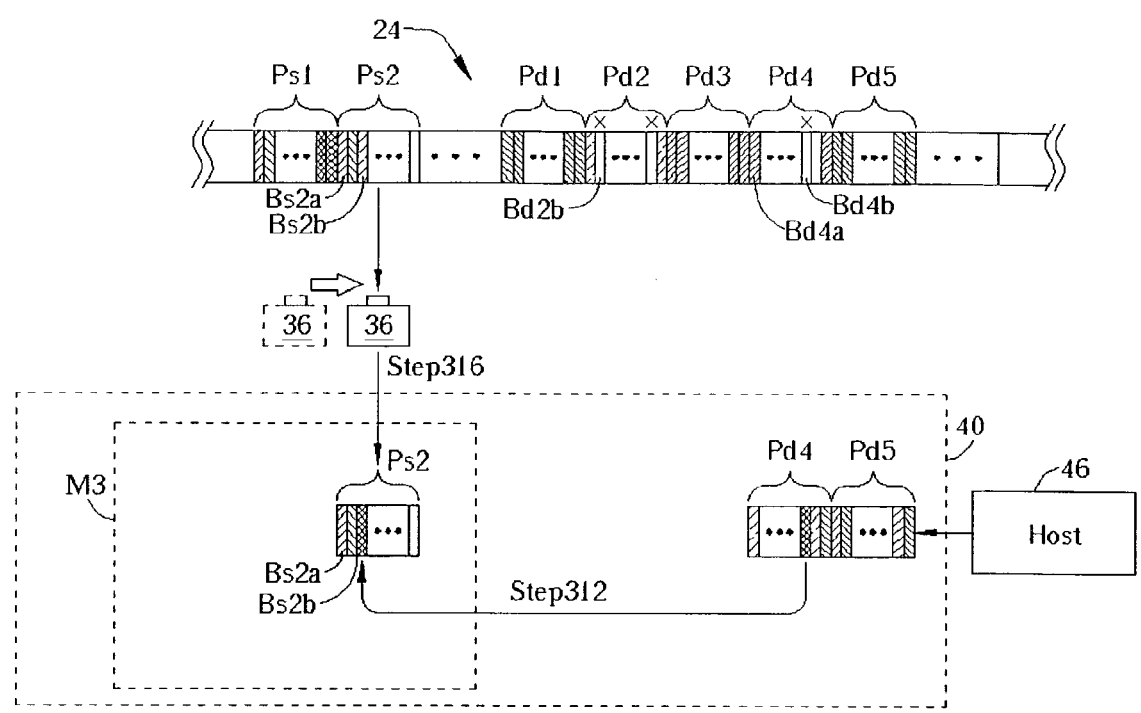
Figure 9E:
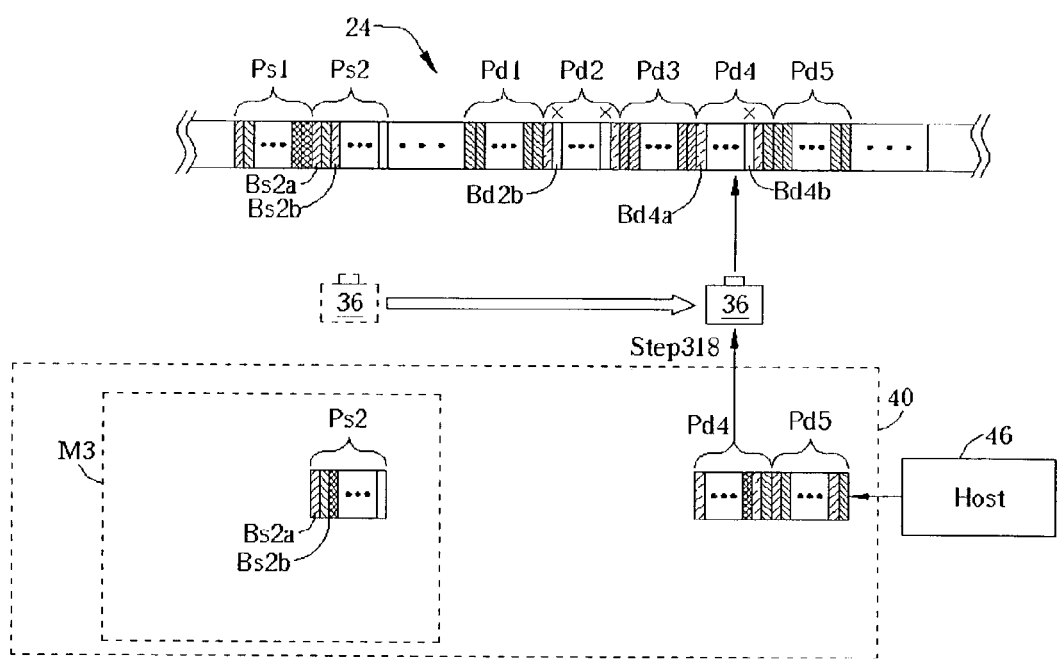

While writing data to the data packet Pd2, because data packet Pd2 has normal data blocks (like Bd2*a*, Bd2*d*) except two defect data blocks Bd2*b* and Bd2*c*, drive 30 encounters defect data blocks in step 308 and checks whether spare blocks replace the two defect data blocks stored in memory area M3 in step 310. Two spare blocks Bs1*b* and Bs1*c* for replacing the two defect data blocks Bd2*b* and Bd2*c*, respectively, are attached to spare packet Ps1 which has read to memory M3 in step 304. In FIG. 9B, drive 30 adds (copies) two data initially written to the two defect data blocks Bd2*b* and Bd2*c* to two spare block Bs1*b* and Bs1*c* in memory M3. Notice that pickup head 36 does not necessarily seek to corresponding location of spare packet Ps1 and continues to execute defect management because of spare packet Ps1 having been read to memory M3. After step 312, drive 30 is capable of continuing to execute step 318 to write data into data packets Pd2, Pd3 on track 24. As FIG. 9C illustrates, while writing data into data packet Ps4, drive 30 encounters a defect data block Bd4*b*. Spare block Bs2*b* of Ps2 is the replacing spare block for replacing the defect data block Bd4*b*; while finding the spare packet Ps2 is not stored in the memory area M3 in step 310, then execute step 314. In step 314, because the spare packet Ps1 stored in memory area M3 has been refreshed (added data initially written in defect data block Bd2*b*, Bd2*c*), at this time, write the spare packet Ps1 stored in memory area M3 back to track 24; and release the spare packet Ps1 stored in M3 originally. As shown in FIG. 9D, after processing cache data stored in the memory area M3 in step 314, drive 16 would read spare packet Ps2 comprising spare block Bs2*b* in memory area M3 in step 316 and return to step 312 to add data which is initially written to defect data block Bd4*b* in memory area M3. And then, as shown in FIG. 9E, spare packet Ps2 cannot be written back on track 24 immediately, because defect data blocks may be encountered in following write process and spare blocks of spare packet Ps2 could take place of them. If the following write process remains to add data in spare packet Ps2, add data to held spare packet Ps2 in memory area M3 (step 312) and pickup head 36 do not have to seek the spare packets. In other words, the spare packet Ps2 becomes new cache data for defect management. After processing defect management toward data block Pd4*b* and refreshing cache data stored in memory area M3, drive 30 is able to continue to write data in data packets Pd4 and Pd5 (step 318).

Based on above discussion, the present invention is through pre-reading spare packets stored in memory area M3 as a cache. Because close defect data blocks are also substituted by close spare blocks, the present invention pre-reads a plurality of close spare blocks (an identical spare packet or spare blocks of close spare packet) stored in memory area M3 as cache. As in the previous description, while the drive writes the data to an optical disk, regarding a packet as an unit, the data stored in the spare block which have replaced other the defect data block in the spare packet, has to read in the memory of the drive until adding new data along together with as a packet, writes back to the optical disk. In prior art, encountering a defect data block each time has to read or write the spare block each time so as to complete a defect management. In the present invention, because the spare packet has been already read to the memory area M3, if the plurality of encountered defect data blocks are replaced by the different spare blocks all attached to the same spare packet during write process, the pickup head pickup head 36 do not necessarily repeat reading and writing spare packets; the plurality of defect data blocks is handled directly in the memory area M3, and is written back the spare packet to the optical disk. In other words, in the time need for executing one time spare-packet-read or spare-packet-write, the pickup head can complete defect managements for the plurality of defect data blocks. As shown in FIG. 9A, FIG. 9B, FIG. 9C, the pickup head 36 only reads the spare packet Ps1 (FIG. 9A) once and writes the spare packet Ps1 (FIG. 9C) once, so that it completes the defect management for the defect data blocks Bd2b, Bd2c one time. The more defect data blocks are replaced by spare blocks attached to the same spare packet Ps1, the more pronounced the advantage of the present invention is. Reading or writing one spare packet can perform defect managements for more defect data blocks.

Besides, the more spare packets are stored in the memory area M3, the less times of reading or writing the spare packets with the pickup head 36. For example, as illustrated in FIG. 9A to 9D, if the spare packet Ps1, Ps2 has been read in the memory area M3 in step 304 shown in FIG. 9A, the pickup head 36 no longer reads the spare packet Ps2 in the memory area M3 in step 316. While reading or writing adjacent spare packets (like the adjacent spare packets Ps1, Ps2 shown in FIG. 9A), the pickup head 36 can execute a sequence of reading or writing; In other words, the pickup head 36 can read the adjacent spare packets in turn instead of seeking across a plurality of packets. A sequence of reading a number of the adjacent spare packets in step 304 and step 316 or a sequence of writing a number of refreshed spare packets back to the optical disk 22 in step 314 are capable of reducing the spent time and apparatus operations during reading or writing data, promoting the efficiency of defect management.

In addition, the data-writing method of the invention also reduces the number of times that data is written to an optical disk, increasing the service life of the optical disk. For instance, while running certain applications, the host 46 repeatedly writes data on the same region on the optical disk. Please refer to FIG. 9A to 9E. After writing a data in the data packets Pd1 to Pd3, the host 46 probably overwrites another data in the data packets Pd1 to Pd3 under some circumstances. On account of the data being written to the same data packets, the repeated write processes encounters the same defect data blocks (like defect data blocks Bd2b, Bd2c, Bd4b). In the prior art, while encountering a defect data block during the write process each time, the data is written to the spare block corresponding to the defect data block each time; while writing data to the identical defect data block again, the data is written to the identical spare block corresponding to the identical defect data block again. In contrast, based on the present invention, while writing data to the defect data block in the first time, the data originally written to the defect data block is temporarily not written in the spare block corresponding to the defect data block, but holds the data in the memory area M3 instead (shown in FIG. 9B). While writing another data to the identical defect data block in the second time, because the memory area M3 has established the spare block as a cache, the new data is temporarily not written on the optical disk, but as long as refreshes the data corresponding to the spare block in the memory area M3 instead. In other words, while the second data-writing, flow 300 will execute step 308, 310, 312 and will not execute step 314 (in this step, the data within the memory area M3 is really written on the optical disk). In other words, for a certain defect data block, as long as the memory area M3 still maintains the spare block corresponding to the defect data block as a cache, no matter how many times the data-writing is executed, the data is not necessarily actually written in the spare block of the optical disk in the invention; Until the flow 300 refreshes the cache and excludes the spare block from the cache (step 314), the single data-writing in the spare block is performed. In this way, the write flow data of the invention can substantially reduce the number of times of writing/overwriting to the optical disk (particularly to the spare blocks) and can increase the life of the optical disk.

Figure 10:
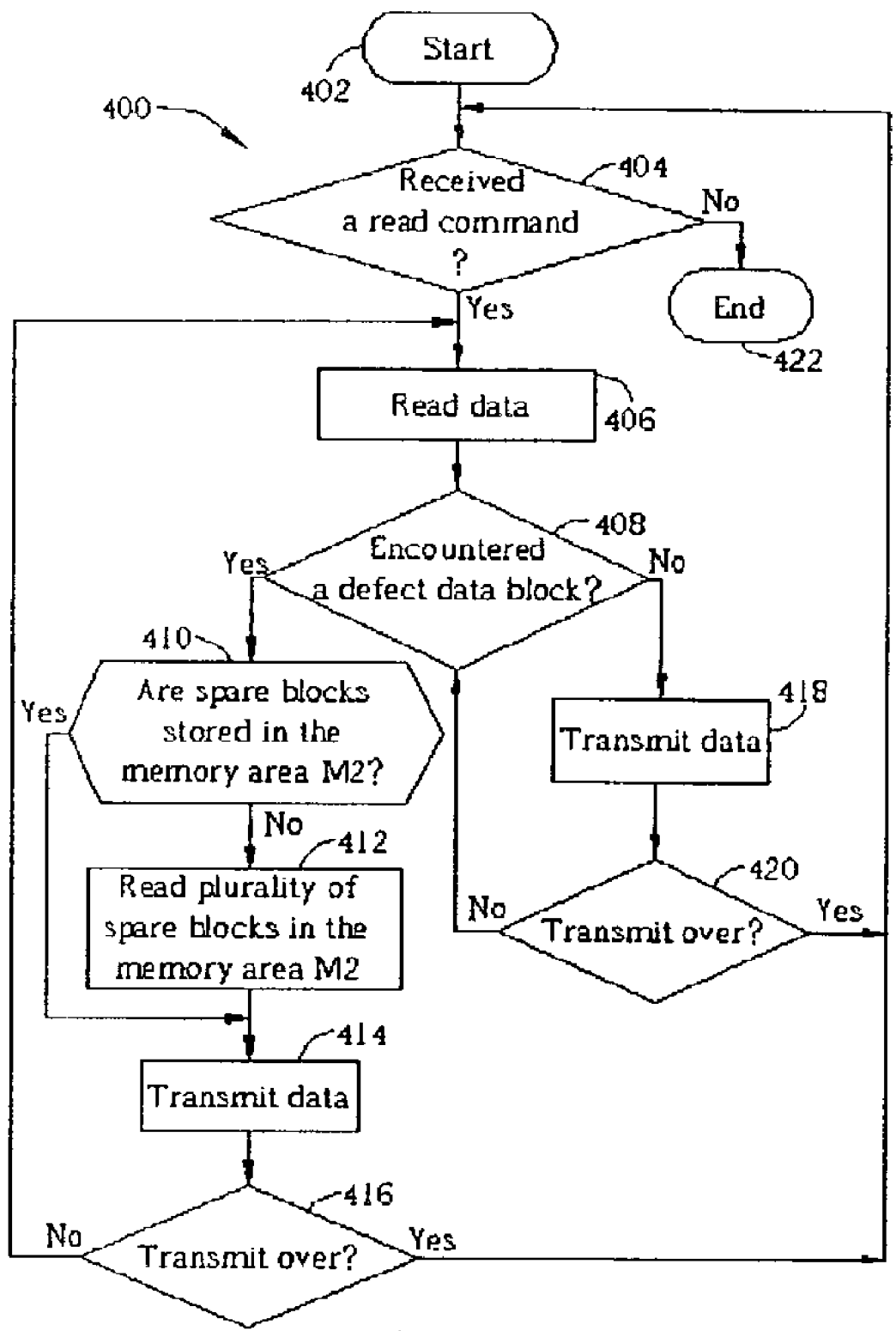
FIG. 10 is a flowchart illustrating a read flow of the present optical disk.

In contrast to the write process 300, the invention is able to utilize the same principle to promote an efficiency of data-reading. Please refer to FIG. 10. FIG. 10 is a flow chart of utilizing the memory area M2 as a cache to process the data-reading according to the present invention. Read flow 400 is as follows:

Step 402: Start; read the data on the optical disk 22.

Step 404:

Determine whether the drive 30 receives a read command from the host 46, if yes, go to step 406; if not, go to step 422.

Step 406:

According to the read command from the host 46, read the data within the optical disk 22. The host 46 assigns the drive 30 to read data within which data blocks.

Step 408:

The drive 30 can detect whether the read data block is a defect data block according to the defect table on the optical disk 22; if it is, go to step 410; If not, go to step 418.

Step 410:

When encountering a defect data block in the read data block, then the drive 30 can further detect whether the spare block replacing the defect data block has stored in the memory area M2 or not according to the defect table. If not, go to step 412; If yes, go to step 414.

Step 412:

In the previous steps, the drive 30 has known the address of the spare block corresponding to the defect data block. At this time, the drive 30 reads the spare blocks to the memory area M2; The more important thing is that the drive 30 reads the adjacent spare blocks (of the same spare packet or even of the adjacent spare packets) to the memory area M2 as caches.

Step 414:

While flow 400 executes this step, the memory area M2 has stored essential corresponding spare blocks for replacing the encountered defect data blocks in step 408. Meanwhile, the data within these spare blocks stored in the memory area M2 can be copied to which step 406 appoints to obtain the whole data that the host 46 requests. At this time, transmit data to the host 46.

Step 416:

If the data requested by the host 46 is transmitted to the host 46, go to step 404; if not, go to step 406.

Step 418:

If the read data blocks requested by the host 46 have no defect data block, transmit the read data in step 406 to the host 46.

Step 420:

If completing the data transmission requested from the host 46, go to step 404; if not, return to step 408.

Step 422: End.

Figure 11A:
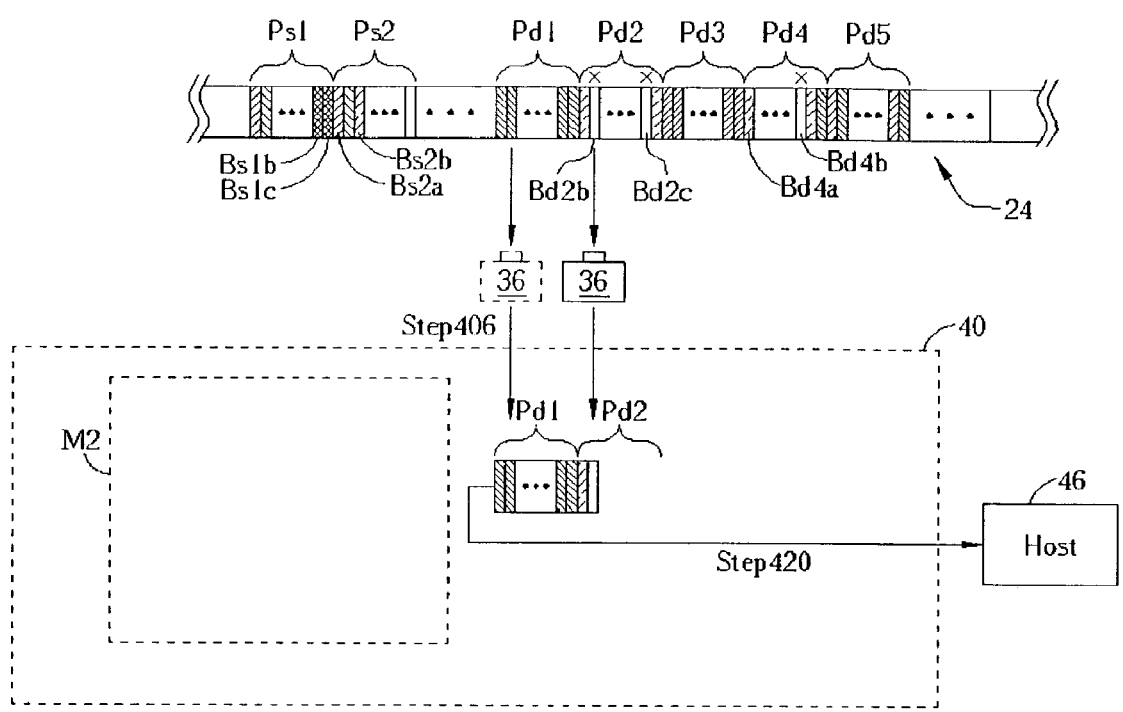
FIG. 11A to FIG. 11D are allocation schematic diagrams of related data while the flow illustrated in FIG. 10 is performed with the drive shown in FIG. 7.
Figure 11B:
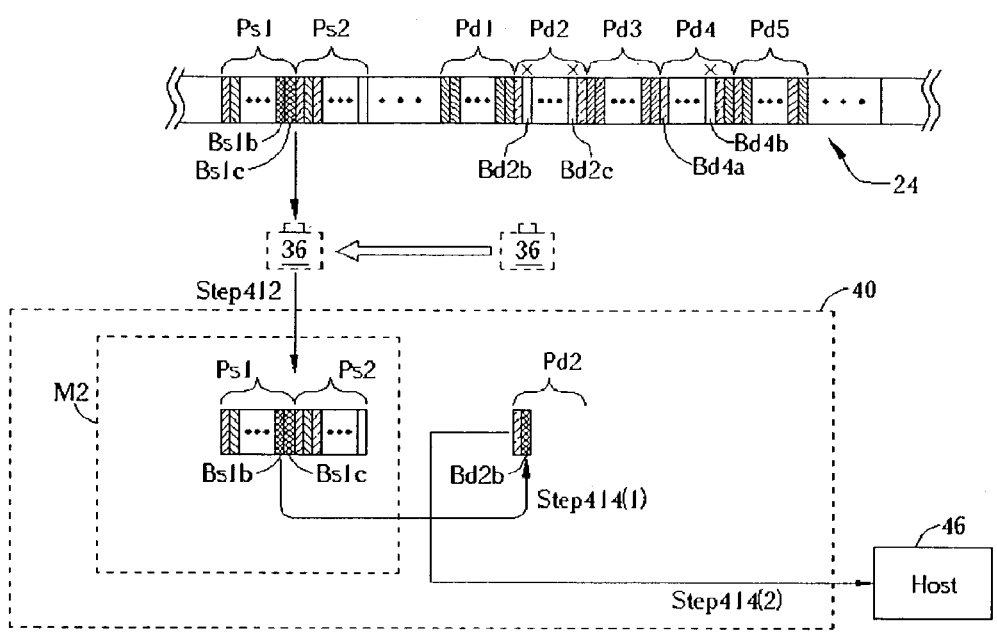
Figure 11C:
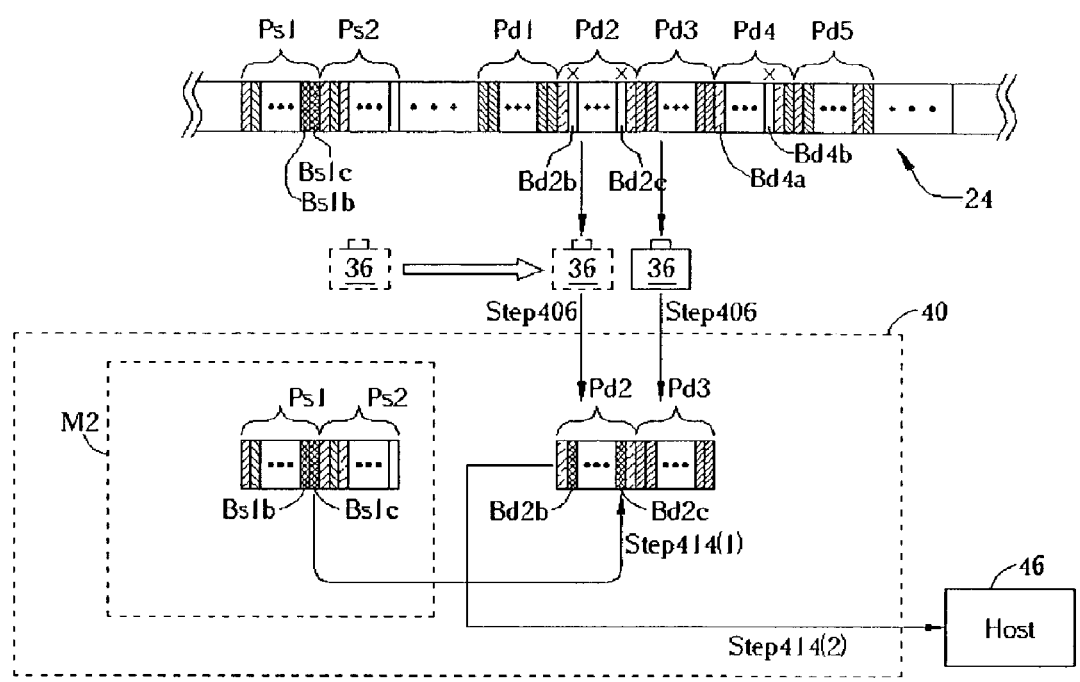
Figure 11D:
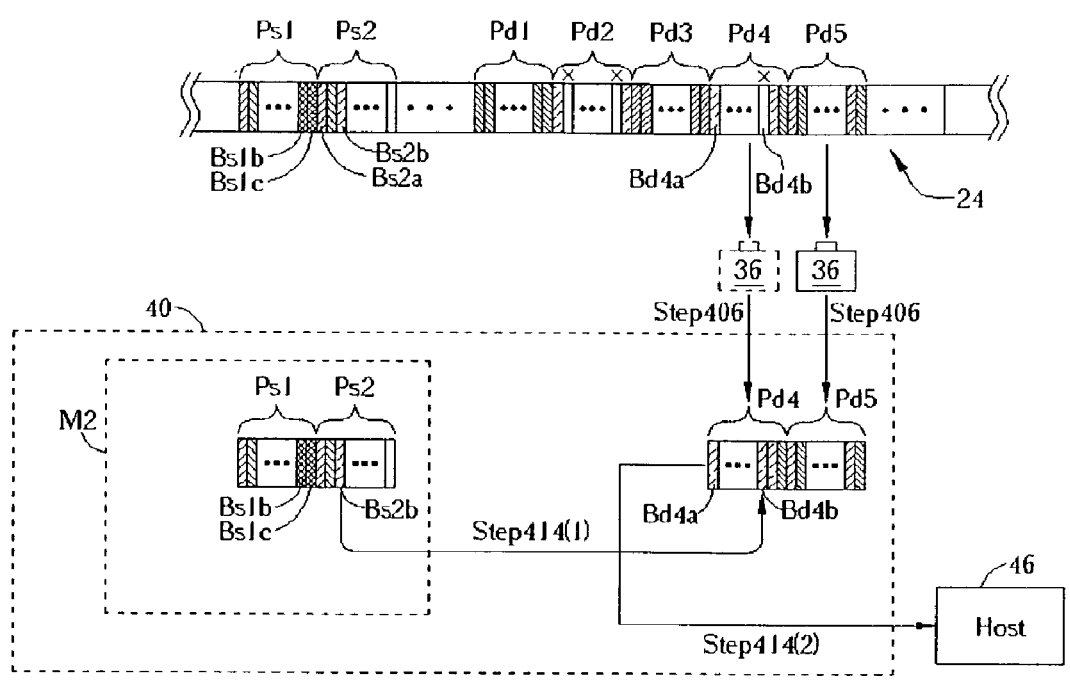

Please refer to FIG. 11A to FIG. 11C. Take FIG. 11A to FIG. 11C as an example to illustrate the process of the read flow 400 in detail; FIG. 11A to FIG. 11C are schematic diagrams about the data allocation of the track 24, the memory area M2, and the memory 40 during the flow 400. As shown in FIG. 11A, assume that the drive 30 in step 404 receives a read command from the host 46 to read data packets Pd1 to Pd3 on the track 24 in step 404. Hence, in step 406, the drive 30 starts to read data within the data packets Pd1 to Pd3 into the memory 40 with the pickup head 36 and transmits these data to the host 46. There are two defect data blocks Bd2b, Bd2c in the data packet Pd2. And there are two spare blocks Bs1b, Bs1c, in place of the two defect data blocks Bd2b, Bd2c respectively, in a spare packet Ps1. Because the read data blocks in step 406 have a defect data block Bd2b, so flow 400 executes from step 408 to step 410. As shown in FIG. 11A, suppose that the memory area M2 has not stored any spare packets (or the stored spare packet excluding the spare packet Ps1) yet. Therefore, in FIG. 11B, the pickup head 36 moves to the corresponding location of the spare block Bs1b and reads the spare block Bs1b into the memory area M3. It is noteworthy that based on the present invention, it reads not only the required spare block Bs1b but also other adjacent spare blocks in step 408. As shown in FIG. 11B, the pickup head 36 reads the spare packet Ps1 including spare blocks Bs1b, Bs1c along together with an adjacent spare packets Ps2 into the memory area M2 as caches. In step 414, the data within the spare block Bs1b read into the memory area M2 is copied to the defect data block Bd2b in the memory 40 (marked as step 414(1) in FIG. 11B). And as shown in FIG. 11C, after the, follow-up read encountering a defect data block Bd2c, the drive 30 is able to directly get the corresponding spare block Bs1c from the memory area M2 and to copy it to the memory 40 resulting in that the drive 30 can get data within each data block of the data packet Pd2 completely (marked as 414(2) in FIG. 11B), and can transmit to the host 46 (marked as step 414(2) in FIG. 11B). The spare packet Ps1, Ps2 in the memory area M2 go on to reserve and regard as cache data. As shown in FIG. 11D, if the host 46 begins requesting data within the data packet Pd4, Pd5 again and a defect data block Bd4b of the data packet Pd4 is substituted by the spare block Bs2b of the spare packet Ps2, then it can find out the spare block Bs2b in the memory area M2 directly and copies it to the data packet Pd4 which have been read in the memory 40 while from step 408 to step 410, so as to obtain the all entire data within the data packet Pd4 in step 414 and to transmit to the host 46, achieving the read command from the host 46. Notice that the pickup head 36 do not seek to the corresponding location of the spare packet Ps2 on the optical disk 22, but the drive 30 is capable of achieving the defect management of the defect data block Bd4b.

Referring to FIG. 11A to 11D, because of the established cache data in memory area M2, the pickup head 36 only reads a plurality of spare blocks once (FIG. 11B), completing a defect managements for three defect data blocks. If the data packets Pd1 to Pd5 further have more defect data blocks all substituted by spare blocks of the spare packets Ps1, Ps2, the pickup head 36 can cover more defect managements and also can highlight the advantages of the present invention more. Besides, the more established cache data in memory area M2 are (read more spare blocks or spare packets), the less times the pickup head 36 seeks. That promotes the efficiency of the defect management. When refreshing the cache data in the duration from step 410 to step 412, the original spare blocks (or spare packets) in memory area M2 also can be selectively released in order to reserve space room for storing the plurality of read spare packets in step 414. In contrast to flow 400, while encountering a defect data block, the pickup head has to seek to process a defect management and reduces the efficiency of data-reading.

In prior art, no matter which data-writing process or data-reading process is, encountering a single defect data block can interrupt the original data-writing process or data-reading process, the pickup head achieves a defect management mechanism with performing a seeking across several data packets resulting in a lower efficiency due to frequent machinery operations, maintain cost raise, and a consumption of the mechanism part of the drive. Comparatively, during the data-writing process or data-reading process of the present invention, the plurality of spare blocks (especially the plurality of adjacent spare blocks) in the memory area M2, M3, respectively, are established as cache data. While encountering defect data blocks, the drive can utilize the previous spare blocks regarding as cache data to perform defect managements. Accesses of the memory area M2, M3 only depending on the operation of the electrical circuit can substantially promote the efficiency of the defect management. The pickup head performing substantial seeks in the moment of creating or refreshing cache data is able to reduce the effect of machinery operations of the drive and a consumption of the mechanism part of the drive in data-writing process or data-reading process. Furthermore, as stated above, the repeated data-writing into the identical spare block can be substituted by a cache operation to reduce the times of the actual data-writing to extend the validation period of the optical disks. According to the present invention, the process of the data-writing and data-reading can match mutually; during the data-writing, the adjacent spare blocks can arrange to replace the close defect data blocks (as it is, that is the basic work principle of CD-MRW specification). In this way, during the write process 300, the numerous refreshing spare blocks can be gathered together to write back to the optical disk in one time (step 314 shown in FIG. 8). The single pickup-head-seeking can cover as more required defect managements of the defect data blocks as possible. At the same time, during the write process 400, if close defect data blocks are replaced by the adjacent spare blocks, after the plurality of the adjacent spare blocks are established as cache data in step 412 (FIG. 10), the following sequence data-readings are able to directly get the required spare blocks from the cache data while encountering the plurality of the defect data blocks. The pickup head does not necessarily seek many times but completes the required defect managements of numerous defect data blocks. Remark that the above discussion about the present invention is under the CD-MRW specification, but the spirit of the invention can apply to other optical disk specifications, such as DVD+MRW specification, which utilized the spare blocks to perform defect managements.

Accordingly, it is an advantage of the claimed invention that the method is able to pre-read spare blocks as a cache to carry out defect management.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of writing data to an optical disk, the optical disk comprising a plurality of data blocks for recording data and a plurality of spare blocks for replacing a plurality of corresponding defect data blocks, the method comprising:

caching a predetermined amount of the spare blocks into a cache memory;

writing data to a predetermined amount of the data blocks of the optical disk according to a write command;

when encountering a defect data block, checking if a required spare block corresponding to the defect data block is in the cache memory; and writing data that should be written to the defect data block to the required spare block in the cache memory if the required spare block is in the cache memory.

2. The method of claim 1, further comprising:
writing at least one refreshed spare block in the cache memory to at least one corresponding spare block in the optical disk after writing the data to the data blocks of the optical disk;
wherein the refreshed spare block is the spare block being stored in the cache memory that has been changed while being stored in the cache memory from writing data to the cache memory when encountering the corresponding defect data block.

3. The method of claim 1, further comprising:
if the required spare block is not in the cache memory,
writing at least one refreshed spare block in the cache memory to the optical disk, wherein the refreshed spare block is the spare block being stored in the cache memory that has been changed while being stored in the cache memory from writing data to the cache memory when encountering the corresponding defect data block;
reading a new amount of spare blocks from the optical disk to the cache memory after writing the refreshed spare block to the optical disk, the new amount of spare blocks including at least the required spare block.

4. The method of claim 3, wherein the new amount of spare blocks further includes adjacent spare blocks being adjacent to the required spare block on the optical disk.

5. The method of claim 3, further comprising after reading the new amount of spare blocks from the optical disk, writing the data that should have been written to the defect data block to the required spare block in the cache memory.

6. The method of claim 1, further comprising pre-reading a plurality of spare blocks from the optical disk to the cache memory before beginning writing the data to the data blocks of the optical disk.

7. The method of claim 6, further comprising:
assigning the predetermined amount of data blocks for writing the data on the optical disc according to the write command; and
pre-reading the predetermined amount of spare blocks from the optical disk to the cache memory corresponding to the assigned data blocks.

8. The method of claim 1, wherein the corresponding spare blocks of the optical disk are located within spare packets, the method further comprising reading a plurality of spare packets from the optical disk to the cache memory.

9. The method of claim 8, further comprising:
writing refreshed spare packets in the cache memory to the optical disk after writing the data to the data blocks of the optical disk;
wherein refreshed spare packets are spare packets in the cache memory that include spare blocks that have been changed while being stored in the cache memory from writing data to the cache memory when encountering the defect data blocks.

10. The method of claim 8, further comprising:
if the required spare block is not in the cache memory,
writing refreshed spare packets in the cache memory to the optical disk, wherein refreshed spare packets are spare packets in the cache memory that include spare blocks that have been changed while being stored in the cache memory from writing data to the cache memory when encountering the defect data blocks;
reading a new plurality of spare packets from the optical disk to the cache memory after writing the refreshed spare packets to the optical disk, the new plurality of spare packets including at least the required spare block.

11. A method of reading data from an optical disk, the optical disk comprising a plurality of data blocks for storing data and a plurality of spare blocks for replacing a plurality of corresponding defect data blocks, the method comprising:
caching a predetermined amount of the spare blocks into a cache memory;
reading data from a predetermined amount of the data blocks of the optical disk according to a read command;
when encountering a defect data block, checking if a required spare block corresponding to the defect data block is in the cache memory; and
utilizing data that is stored within the required spare block in the cache memory to replace data of the defect data block if the required spare block is in the cache memory.

12. The method of claim 11, further comprising:
if the required spare block is not in the cache memory,
reading a new plurality of spare blocks from the optical disk to the cache memory, the new plurality of spare blocks including at least the required spare block.

13. The method of claim 12, wherein the new plurality of spare blocks further includes adjacent spare blocks being adjacent to the required spare block on the optical disk.

14. The method of claim 12, further comprising after reading the new amount of spare blocks from the optical disk, utilizing data that is stored within the required spare block in the cache memory to replace data of the defect data block.

15. The method of claim 11, further comprising pre-reading a amount of spare blocks from the optical disk to the cache memory before beginning reading the data from the data blocks of the optical disk.

16. The method of claim 15, further comprising:
determining assigned data blocks for reading the data on the optical disc; and
pre-reading the plurality of spare blocks from the optical disk to the cache memory being a set of spare blocks corresponding to the assigned data blocks that are indicated in the defect table of the optical disk as being defect blocks.

17. The method of claim 11, wherein the corresponding spare blocks of the optical disk are located within spare packets, the method further comprising reading a plurality of spare packets from the optical disk to the cache memory.

18. The method of claim 17, further comprising if the required spare block is not in the cache memory, reading a new plurality of spare packets from the optical disk to the cache memory, the new plurality of spare packets including at least the required spare block.

19. A method of writing data to an optical disk, the optical disk comprising a plurality of data blocks for recording data and a plurality of spare blocks for replacing a plurality of corresponding defect data blocks, the method comprising:
caching a predetermined amount of the spare blocks into a cache memory;
writing data to a predetermined amount of the data blocks of the optical disk; and
when encountering a plurality of defect data blocks having required spare blocks cached in the cache memory, writing data that should be written to the encountered defect data blocks to required spare blocks cached in the cache memory before writing at least one refreshed spare block in the cache memory to the optical disk;

wherein the refreshed spare block is the spare block being stored in the cache memory that has been changed while being stored in the cache memory from writing data to the cache memory when encountering the corresponding defect data block.

20. A method of reading data from an optical disk, the optical disk comprising a plurality of data blocks for recording data and a plurality of spare blocks for replacing a plurality of corresponding defect data blocks, the method comprising:

caching a predetermined amount of the spare blocks into a cache memory;

reading data from a predetermined amount of the data blocks of the optical disk according to a read command;

when encountering a plurality of defect data blocks having required spare blocks cached in the cache memory, utilizing data stored within the required spare blocks in the cache memory to replace data of the encountered defect data blocks before reading a new plurality of spare blocks from the optical disk to the cache memory.

* * * * *